United States Patent Office 2,874,285
Patented Feb. 17, 1959

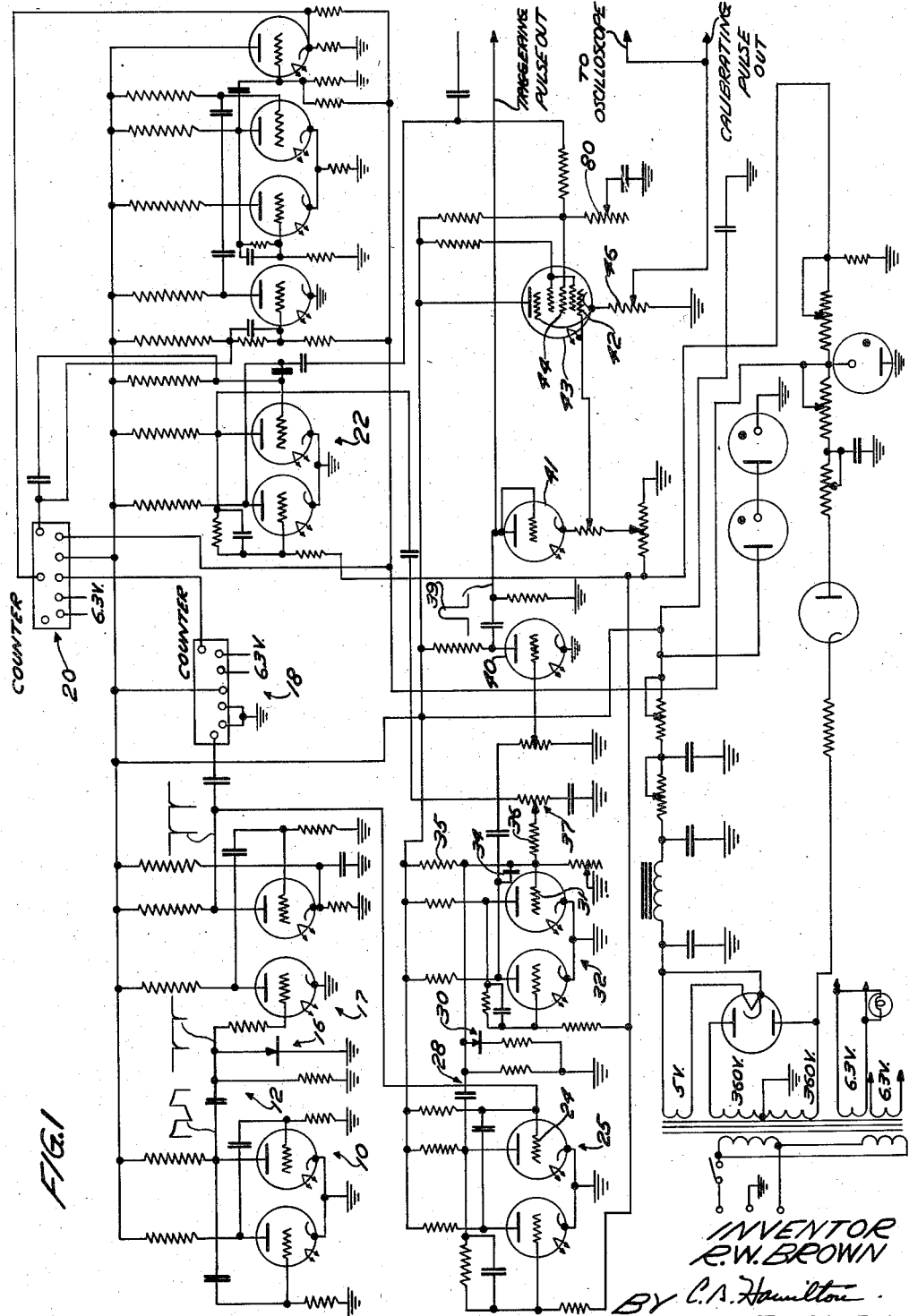

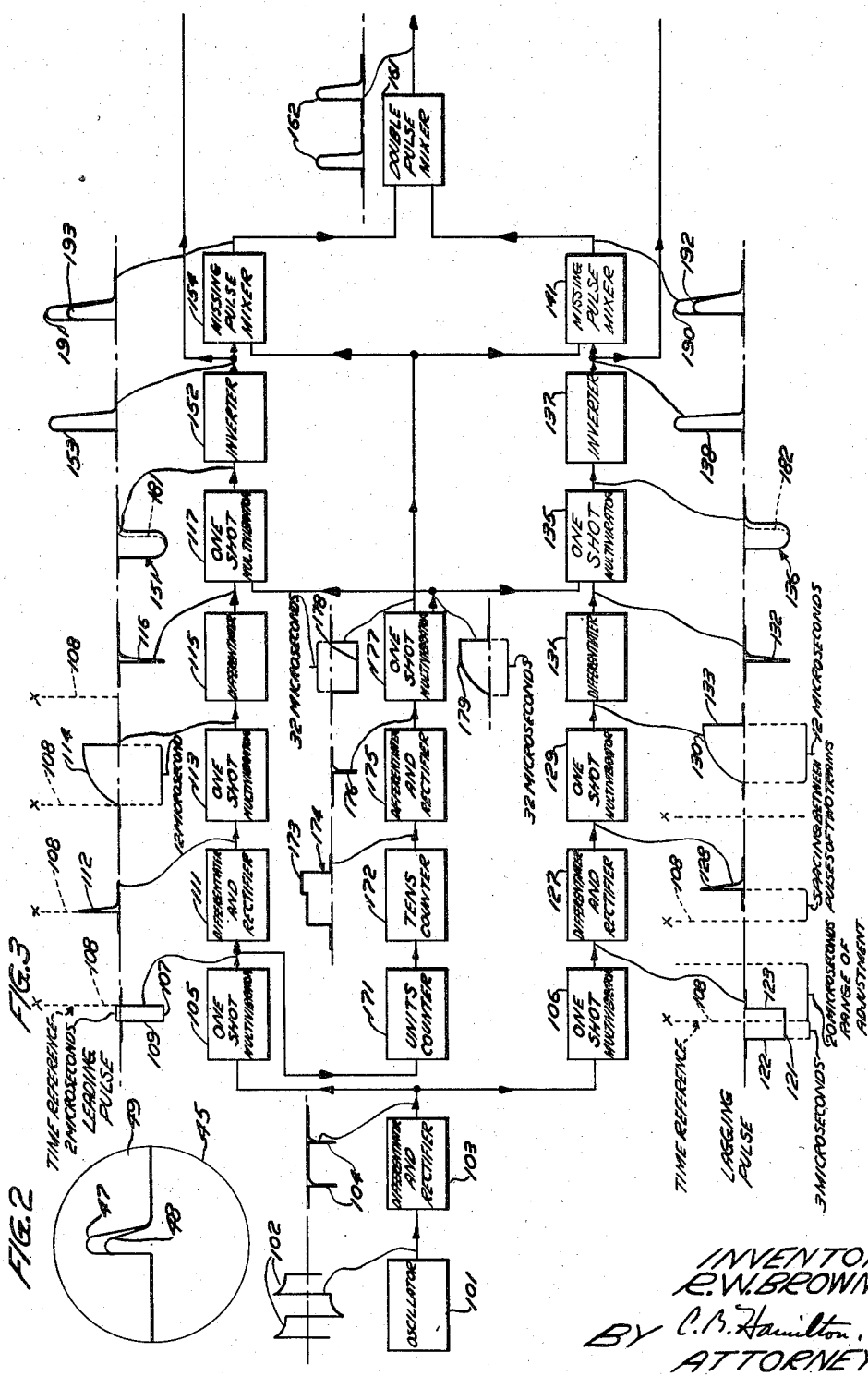

2,874,285
CIRCUITS FOR FORMING TRAINS OF PULSES

Raymond W. Brown, Evergreen Park, Ill., assignor to Western Electric Company, Incorporated, New York, N. Y., a corporation of New York Application May 13, 1955, Serial No. 508,205

7 Claims. (Cl. 250—27)

This invention relates to circuits for forming trains of pulses, and more particularly to apparatus for forming trains of pulses having calibrating pulses occurring periodically therein.

In the testing of pulse-forming devices, such as, for example, magnetrons, it is necessary to be able to detect pulses of shorter widths and amplitudes than the normal width and amplitude of the pulses from such devices. To calibrate apparatus for testing such apparatus, it is very helpful to have trains of pulses which include pulses of lesser amplitude and duration than the desired pulses along with satisfactory pulses, but no satisfactory apparatus for providing such trains of pulses has been known hitherto.

An object of the invention is to provide new and improved apparatus for forming trains of pulses.

Another object of the invention is to provide apparatus for forming trains of pulses having calibrating pulses occurring periodically therein.

A further object of the invention is to provide apparatus for creating trains of pulses in which pulses less wide and of less amplitude by selected percentages than the width and amplitude of the remainder of the pulses are formed periodically to provide a standard for calibrating a meter.

In an apparatus illustrating certain features of the invention, a train of actuating pulses is formed and a counter is actuated by each of the pulses. The counter forms a pulse at the end of each multiple of the actuating pulses, and damping pulses of a predetermined width are formed from the counter pulses. The actuating pulses are delayed by a period of time sufficient to cause one actuating pulse to occur during the occurrence of the damping pulse, and the delayed actuating pulses and the damping pulses are mixed together to form groups of uniformly spaced pulses of a given amplitude separated by pulses of a different amplitude.

A complete understanding of the invention may be obtained from the following detailed description of apparatus forming a specific embodiment thereof, when read in conjunction with the appended drawings, in which:

Fig. 1 is a diagrammatic view of a circuit illustrating one embodiment of the invention for forming trains of pulses having calibrating pulses occurring periodically therein;

Fig. 2 is a view of a portion of the circuit shown in Fig. 1, and

Fig. 3 is a block diagram of a circuit forming an alternative embodiment of the invention.

Referring now in detail to the drawings, there is shown therein a free-running multivibrator 10, which generates square-wave alternating current pulses 11 which are differentiated by a network 12, and the positive pulses are eliminated by a rectifier 16. The remaining portions of the pulses, which are negative, are amplified by a two stage amplifier 17 which builds the pulses to a strong signal. Each pulse flows to an automatically resettable counter 18, which, after it has been actuated ten times sends a pulse to a counter 20, which has been set to send a pulse out after it has been actuated any desired number of times. For example, the counter 20 may be set to send a pulse out after each tenth actuation and automatically reset itself to zero. A commercially available counter suitable for use as the counter 18 is a Model 700A Berkeley decimal counting unit, and a counter suitable for use as the counter 20 is a Model 730 Berkeley preset decimal counter manufactured by the Berkeley Scientific Division of Beckman Instruments, Incorporated. Each pulse from the counter 20 actuates a one-shot multivibrator 22.

Each signal from the amplifier 17 as well as being sent to the counter 18 is applied to a grid 24 of a one-shot multivibrator 25, which forms a pulse 26 of a predetermined duration. A network 28 differentiates the pulses 26 from the one-shot multivibrator 25, and, if the pulse 26 has any positive tail thereon, it is clipped by a rectifier 30. The resulting sharp negative pulse, which is delayed from the leading edge of pulse 26 about fifteen microseconds, is applied to a grid 31 of a one-shot multivibrator 32. The multivibrator 32 has a condenser 34 and a resistance 35 connected thereto for narrowing output pulses thereof, the condenser 34 and the resistor 35 serving to affect the control of the width of the pulses. A resistance 36 and a potentiometer 37 also are connected to the grid 31 and receive a positive signal from the multivibrator 22 on every pulse coincidental to the pulse of the counter 20. The pulse from the multivibrator 22 goes through the resistor 36 and the potentiometer 37 to shorten the pulse from the multivibrator 32.

Whenever the multivibrator 32 is pulsed, it sends a pulse to an inverter 40 which inverts the pulse to form a pulse 39 which is transmitted through a rectifier 41 which sends the resulting pulse to a control grid 42 of a mixing tube 43. Each time the multivibrator 22 is actuated by the counter 20, it sends a negative pulse to a screen grid 44 of the tube 43. These negative pulses, which only occur at intervals controlled by the counters, reduce the amplitude of the periodic pulses with which they coincide.

In order to observe this effect and measure the amplitude of the shortened pulse, the output of tube 43 taken from the cathode follower circuit 46 may be connected to a cathode ray oscilloscope 45, the horizontal sweep circuit of the oscilloscope being triggered with each pulse generated by the multivibrator 10 so that the pulses are superimposed on the screen and the shortened pulse shows up as a pip 48 shorter than the pip 47.

A potentiometer 80 associated with the tube 43 may be adjusted to control only the height of the shortened pulses from the tube 43. The delay imposed by the multivibrator 25 is the same as that imposed by the counters 18 and 20 so that each pulse simultaneous with that triggering the counter 20 arrives at the mixing tube 43 simultaneously with the pulse from the multivibrator 32. The pulses between the shortened pulses serve to trigger the mixing tube 43 to produce normal pulses. The pulses from the mixing tube 43 provide either lower amplitude or narrower pulses which differ from the normal pulses by preselected amounts, and these pulses may be used for calibrating meters and the like.

Embodiment shown in Fig. 3

There is shown in Fig. 3 a block diagram for generating double pulses or pairs of missing pulses occurring regularly in a train of pulses of a predetermined frequency, and this diagram includes an oscillator 101 which generates a square voltage wave 102 which is sent to a differentiater and rectifier 103 which cuts off the positive pulses and sends sharp negative pulses 104 to one-shot multivibrators 105 and 106. The one-shot multivibrator 105 forms an output pulse 107 having a trailing edge 108 which is a predetermined period of time behind the occurrence of the pulse 104 causing the pulse 107 to occur. For example, a leading edge 109 of the pulse 107 occurs simultaneously with the pulse 104 and the trailing edge 108 is two microseconds behind the leading edge 109. The pulse 107 is transmitted to a differentiater and rectifier 111 which forms an output pulse 112 coincident in time with the trailing edge 108 of the pulse 107, which actuates a one-shot multivibrator 113 to form a saw-tooth pulse 114 of a predetermined width, the start of the pulse 114 being coincident with the occurrence of the pulse 112. Then the pulse 114 is sent to a differentiater 115 which forms an output pulse 116 sent to a one-shot multivibrator 117.

The pulses 104 also actuate the multivibrator 106 to form pulses 121, one pulse 121 for every pulse 104, a leading edge 122 of each pulse 122 being coincident with the pulse 104 and a trailing edge 123 occurring a predetermined period of time after the forward or leading edge 109 of each pulse 104. The period of time between edges 122 and 123 is greater by a preselected length of time, for which the multivibrator 106 is adjusted, than the lag between the leading edge 109 and the trailing edge 108 of the pulse 107 so that the trailing edge 123 occurs several microseconds after the occurrence of each trailing edge 108. Each pulse 121 is differentiated and rectified by a differentiater and rectifier 127 to form a positive pulse 128 coincident with the trailing edge 123 of the pulse 121, each pulse 128 occurring a preselected number of microseconds behind each pulse 112.

The pulses 128 actuate a one-shot multivibrator 129 to form saw-tooth pulses 130 which are sent to a differentiater 131. The width or duration of the pulse 130 is equal to the duration of the pulses 114 and the differentiater 131 forms an output pulse 132 coincident with the trailing edge 133 of pulse 130 so that the pulse 132 occurs a preselected number of microseconds behind the occurrence of each pulse 116. The pulses 132 are fed to a one-shot multivibrator 135 which forms with each actuation thereof a pulse 136 which is sent to an inverter 137 which forms an amplified higher positive output pulse 138 which is fed to a missing-pulse mixing tube 141.

Normally the one-shot multivibrator 117 forms pulses 151 which are transmitted to an inverter 152 which inverts and amplifies each pulse 151 to form output pulses 153 which are transmitted to a missing-pulse mixing tube 154. The pulses to the tubes 141 and 154 are fed therefrom through a mixing tube 161 which has an outlet in which the pairs of pulses 162 are fed therefrom. The pulse 107 also is fed to a counter 171 and actuates the counter 171 on the occurrence of each tenth pulse 107 to actuate a counter 172, the counter 172 being set to produce an output pulse 173 having a trailing edge 174 which occurs on the pulse for which the counter 172 is set. For example, if the counter 172 is first actuated by the first pulse from the counter 171, the pulse 173 is started and continues until the counter 172 has been actuated a predetermined number of times by pulses from the counter 171, and on the occurrence of the last pulse from the counter 171, the trailing edge 174 is formed.

The trailing edge of the pulse 174 is fed to a differentiater and rectifier 175 which forms a sharp negative pulse 176 coincident in time with the trailing edge 174, and the pulse 176 is sent to a one-shot multivibrator 177.

The one-shot multivibrator 177 creates output pulses 178 and 179 of opposite polarity and of equal duration. The pulse 179 is sent to the one-shot multivibrators 117 and 135 and is coincident in time with the times at which the pulses 116 and 132 arrive at the multivibrators 117 and 135, respectively. The pulse 179 is of opposite polarity to that of the pulses 116 and 132. Each pulse 179 has the effect of reducing the width of the output pulses of the multivibrators 117 and 135 caused by the pulses 116 and 132. Pulses 181 and 182 are narrower in width than the normal pulses 151 and 136. Thus, depending on the setting of the counter 172 periodically on every tenth, twentieth, thirtieth, or the like, the output pulses of the multivibrators 117 and 135 are reduced in width so that the narrower pulses 181 and 182 are sent to the double-pulse mixer 161 rather than the pair of full width pulses 151 and 136.

The pulse 178 from the multivibrator 177 is sent to the mixers 141 and 154 to reduce the height of the output pulses of the mixers 141 and 154. Thus, the outputs of the mixers 141 and 154 normally are pulses 190 and 191, and, on the occurrence of each pulse coincident with each pulse 178, shorter pulses 192 and 193 are formed instead of the pulses 190 and 191, and the pulses 192 and 193 are fed to the mixer 161. Thus, each pulse which is narrowed by one of the pulses 179 and is sent to the mixer 141 or the mixer 154 also is shortened by the pulse 178 coincident with the pulse 179, and the pairs of pulses 162 forming the output of the double pulse mixer 161 normally are spaced apart a predetermined distance, and each has a predetermined amplitude. For each pair of pulses occurring on a preselected multiple, the amplitude of each pair of pulses and the width of each pulse of the pair is less by a preselected amount than these characteristics of the normal pulses.

The above-described apparatus serves to create pulses for calibrating missing-pulse meters, and for trains of pulses in which a shorter, and, or narrower pulse is formed on each preselected multiple of pulses in the train.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A circuit for forming a calibrating signal, which comprises means for creating a series of sharp pulses of a predetermined frequency, means responsive to a predetermined number of the pulses for creating a second pulse, means responsive to each second pulse for creating a damping pulse of a predetermined polarity and a predetermined duration, means responsive to each sharp pulse for creating a sharply shaped pulse delayed from the sharp pulse substantially one-half the duration of each damping pulse, means for applying the damping pulse to said sharply shaped pulse creating means for varying the duration of the sharply shaped pulses, and means for mixing the sharply shaped pulses of varied duration with the damping pulses to vary the amplitude of said sharply shaped pulses of varied duration.

2. A circuit for forming a calibrating signal, which comprises means for creating a signal of sharp pulses of a predetermined frequency, a recycling counter responsive to a predetermined number of the pulses for creating a pulse, means response to each pulse of the counter for creating a damping pulse of a predetermined polarity and a predetermined duration, means responsive to each sharp pulse for creating a sharply shaped pulse delayed from the sharp pulse substantially one-half the duration of each damping pulse, means for applying the damping pulse to the sharply shaped pulse creating means for varying the duration of the sharply shaped pulse coincident in time with said damping pulse and means for mixing the sharply shaped pulses of varied duration with the damping pulses to vary the amplitude of said sharply shaped pulses of varied duration.

3. A circuit for forming pulses, which comprises an oscillator for forming sawtooth pulses of a predetermined frequency, means for differentiating the pulses, means for clipping the positive components of the differentiated pulses to leave negative actuating pulses, a multivibrator operable when pulsed to form a negative blocking pulse of a predetermined width, a counter responsive to a predetermined number of the actuating pulses for pulsing the multivibrator, a second multivibrator responsive to each actuating pulse for forming a sawtooth pulse of a duration about one-half that of the pulse of the first multivibrator, means for forming a sharp negative intermediate pulse at the trailing edge of each sawtooth pulse, means for mixing the blocking pulses with the intermediate pulses to vary the duration of said intermediate pulses coincident in time with said blocking pulses, means for inverting the intermediate pulses and the intermediate pulses of varied duration, and means for mixing the intermediate pulses of varied duration and the blocking pulses to vary the amplitude of said intermediate pulses of varied duration.

4. A circuit for forming pulses, which comprises an oscillator for forming sawtooth pulses of a predetermined frequency, means for differentiating the pulses, means for clipping the components of the differentiated pulses to leave actuating pulses, triggerable means operable when pulsed to form a negative blocking pulse of a predetermined width, a counter responsive to a predetermined number of the actuating pulses for pulsing the triggerable means, means responsive to each actuating pulse for forming a sawtooth pulse of a duration about one-half that of the pulse of the triggerable means, means for forming a sharp intermediate pulse at the trailing edge of each last-mentioned sawtooth pulse, means for applying the blocking pulses to the intermediate pulse forming means to vary the duration of said intermediate pulses coincident to said blocking pulses, means for inverting the intermediate pulses and the intermediate pulses of varied duration, and mixing means responsive to the inverted pulses and the blocking pulses for forming pulses of said frequency and reducing the amplitude of each output pulse coincident with each blocking pulse.

5. A circuit for forming pulses, comprising an oscillator for forming first sawtooth pulses of a predetermined frequency, a network connected to the oscillator for differentiating and clipping the sawtooth pulses to leave actuating pulses, a first multivibrator operable when pulsed to form a negative blocking pulse of a predetermined duration, a counter responsive to a predetermined member of the actuating pulses for pulsing the first multivibrator, a second multivibrator responsive to each actuating pulse for forming a second sawtooth pulse of less duration than the blocking pulse of the first multivibrator, circuit means for differentiating the second sawtooth pulses to leave a sharp negative pulse at the trailing edge of each second sawtooth pulse, a third multivibrator responsive to each sharp negative pulse for forming an output pulse of predetermined duration, means connected to the third multivibrator and responsive to the blocking pulses from the first multivibrator for varying the duration of said output pulses coincident in time with said blocking pulses whereby sequences of output pulses of said predetermined duration are separated by output pulses of varied duration, means for inverting said output pulses, and means for mixing the inverted output pulses and the blocking pulses for varying the amplitude of each of the inverted output pulses of varied duration.

6. A pulse-forming circuit, which comprises a mixing tube including a control grid and a screen grid for producing output pulses on pulsing of the control grid, the amplitude of the output pulses being controlled by the potential of the screen grid, means for forming actuating pulses, means responsive to each actuating pulse for sending a positive pulse to the control grid, a counter responsive to a predetermined number of actuating pulses for forming a trigger pulse, triggerable means responsive to the trigger pulse for sending a blocking pulse to the screen grid to vary the amplitude of predetermined ones of the output pulses, and mixing means responsive to the blocking pulse for varying the duration of said predetermined ones of the positive pulses sent to the control grid.

7. A pulse-forming circuit, which comprises a mixing tube having a control grid and a screen grid, means for producing sharp signal pulses of a predetermined frequency, first pulse-forming means responsive to each sharp signal pulse for sending a positive pulse of a predetermined width to the control grid a predetermined period of time after the occurrence of each signal pulse, a counter responsive to a predetermined number of said sharp signal pulses for forming a trigger pulse, and second pulse-forming means responsive to the trigger pulse for sending a blocking negative pulse to the first pulse-forming means for varying the width of spaced ones of the positive pulses sent to the control grid, said blocking pulse also being sent to the screen grid for varying the amplitude of said spaced ones of the positive pulses.

References Cited in the file of this patent

UNITED STATES PATENTS

| | | |
|---|---|---|
| 2,415,920 | Thomas | Feb. 18, 1947 |
| 2,418,521 | Morton et al. | Apr. 8, 1947 |
| 2,424,833 | Korman | July 29, 1947 |
| 2,425,600 | Coykendall | Aug. 12, 1947 |
| 2,636,988 | Palmer | Apr. 28, 1953 |
| 2,693,531 | Cope et al. | Nov. 2, 1954 |